(12) United States Patent
Rolison et al.

(10) Patent No.: US 6,492,014 B1
(45) Date of Patent: Dec. 10, 2002

(54) MESOPOROUS COMPOSITE GELS AN AEROGELS

(75) Inventors: Debra R. Rolison, Arlington, VA (US); Catherine A. Morris, Springfield, VA (US); Michelle L. Anderson, Alexandria, VA (US); Karen E. Swider Lyons, Arlington, VA (US); Celia I. Merzbacher, Alexandria, VA (US); Joseph V. Ryan, Aurora, OH (US); Veronica M. Cepak, Longmont, CO (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/541,024

(22) Filed: Mar. 31, 2000

Related U.S. Application Data

(60) Provisional application No. 60/132,746, filed on Apr. 1, 1999.

(51) Int. Cl.⁷ .......................... B01J 21/08; B01J 13/00; B32B 5/22; C01B 33/16
(52) U.S. Cl. .................. 428/317.9; 423/338; 501/12; 502/79; 502/233; 502/243; 516/100; 516/111
(58) Field of Search .................. 516/100, 111; 501/12; 423/338; 502/233, 243, 79; 428/317.9

(56) References Cited

U.S. PATENT DOCUMENTS

| | | | |
|---|---|---|---|
| 4,221,672 A | * 9/1980 | McWilliams | 428/317.9 X |
| 5,122,291 A | * 6/1992 | Wolff et al. | 516/111 X |
| 5,160,455 A | * 11/1992 | Clark et al. | 516/111 X |
| 5,275,796 A | * 1/1994 | Tillotson et al. | 516/111 X |
| 5,306,555 A | * 4/1994 | Ramamuthi et al. | 516/111 X |
| 5,381,149 A | * 1/1995 | Dougherty et al. | 501/12 X |
| 5,420,081 A | * 5/1995 | Mattes et al. | 501/12 |
| 5,468,558 A | * 11/1995 | Derleth et al. | 428/317.9 X |
| 5,565,142 A | * 10/1996 | Desphande et al. | 516/100 X |
| 5,789,075 A | * 8/1998 | Frank et al. | 428/317.9 X |
| 5,789,336 A | * 8/1998 | Pazzucconi et al. | 502/233 X |
| 5,948,314 A | * 9/1999 | Geiss et al. | 516/100 X |
| 6,107,350 A | * 8/2000 | Boes et al. | 516/100 |
| 6,140,377 A | * 10/2000 | Schwertfeger et al. | 516/100 |
| 6,303,046 B1 | * 10/2001 | Risen, Jr. et al. | 516/100 X |
| 6,315,971 B1 | * 11/2001 | Wallace et al. | 423/338 |

OTHER PUBLICATIONS

Catherine A. Morris, "Silica Sol as a Nanoglue: Flexible Synthesis of Composite Aerogels", Science vol. 284, Apr. 23, 1999.

Michele L. Anderson, "Colloidal gold Aerogels: Preparation, Properties, and Characterization", Langmuir vol. 15, 1999.

* cited by examiner

*Primary Examiner*—Richard D. Lovering
(74) *Attorney, Agent, or Firm*—John J. Karasek; Joseph T. Grunkemeyer

(57) ABSTRACT

A composite gel or aerogel is formed by commingling a particulate guest (such as a colloidal or dispersed (i.e., non-colloidal) solid or a powder) with a sol which is either about to gel or in which gelation has just started. After addition of the particulate, the mixture is then permitted to gel into a solid, gelled composite with open pores. This solid, gelled composite is then dried in a manner that prevents the collapse of open pores within the solid, gelled composite in which the gel acts as a "nanoglue" that holds the particles together.

23 Claims, No Drawings

MESOPOROUS COMPOSITE GELS AN AEROGELS

This non-provisional application claims benefit of U.S. Provisional Patent Application 60/132,746 filed on Apr. 1, 1999.

BACKGROUND OF THE INVENTION

1. Field of the Invention

The present invention relates generally to composite gels and aerogels and more specifically to mesoporous composite gels and aerogels and their various uses.

2. Description of the Background Art

Xerogels and aerogels derived from the condensation and hydrolysis of metal alkoxide precursors have been studied for a variety of applications, including uses as optical, thermal, and electronic materials. Aerogels, because they are highly porous (80–99% by volume) and have a high surface area (up to 1000 m$^2$/g), are especially well-suited to catalytic and sensing applications, where rapid transport of reactants (or detectable species) and large, accessible surface areas are critical to performance. In composite xerogels and aerogels, the gel structure can act as a host material for immobilized guest particles that perform catalytic, electrochemical or chemical sensing functions.

Typically, guest materials such as catalytic particles have been incorporated into xerogels and aerogels either by adding the guest material or a guest material precursor to a sol-gel precursor mixture before a sol-gel is formed or by impregnating materials into an already-formed xerogel or aerogel. A disadvantage to the method of adding a guest material to a sol-gel precursor mixture prior to forming a sol-gel is that the components may become so thoroughly mixed that the particles of the guest material become completely encapsulated by the sol-gel precursor material. Such encapsulation reduces the exposure of the particles of the guest material to the inner surface area of the subsequently formed gel and thus reduces the effectiveness of the composite for its intended use as a catalyst, sensor, fuel cell, etc. Further, thorough and prolonged mixing of a particulate guest material with a sol can lead to the loss of critical properties, particularly transport properties (which require intimate contact between guest particles) and chemical properties (which involve guest interaction with molecules in the mesopores). A disadvantage to the method of impregnating materials into an already formed aerogel is that the incorporated guest material may leach or wash out of the aerogel.

SUMMARY OF THE INVENTION

Accordingly, it is an object of this invention to provide new composite materials in which a guest solid particulate is fixed within a porous matrix.

It is an other object of the present invention to provide a new composite material in which a guest material fixed within a porous matrix can interact with an infiltrate within the matrix.

It is an other object of the present invention to provide a new composite material in which a guest material is incorporated into a porous matrix so that leaching or washing out of the guest material is minimized.

It is a further object of the present invention to provide new composite materials for use as catalysts; porous black composites (e.g., for blocking stray light); power source electrodes and electrode structures (where the term power source includes batteries, fuel cells, electrolytic capacitors, supercapacitors, photovoltaics, thermophotovoltaics, hybrid battery capacitors, etc.); thermoelectric materials; and chemical, optical, physical and biological sensors.

It is an additional object of the present invention to provide new, nanoscale porous composite materials that achieve transport paths for conductivity of ions, molecules, electrons, phonons, combinations thereof, etc., from guest-to-guest through the microstructure of the aerogel at low volume percentages of particulate guest.

These and additional objects of the invention are accomplished by commingling a particulate guest (such as a colloidal or dispersed (i.e., non-colloidal) solid or a powder) with a sol which is either about to gel or in which gelation has just started. After addition of the particulate, the mixture is then permitted to gel into a solid, gelled composite with open pores. This solid, gelled composite is then dried in a manner that prevents the collapse of open pores within the solid, gelled composite in which the gel acts as a "nanoglue" that holds the particles together. Introducing the guest particulate into a sol and forming a gel in this manner prevents encapsulation of the guest particles by the sol material while sufficiently incorporating the guest particles into the gel network so that the guest material does not leach or elute out during subsequent processing steps or during the subsequent use of the composite. The bulk and surface properties of both the guest material and sol material are retained on the nanoscale . The transport- and density-dependent properties of the composite gel can be tuned by varying the volume fraction of the guest material, thereby increasing the design flexibility of these nanoscale materials for optical, chemical, thermal, magnetic, and electronic applications. The chemical and physical properties of the composite material can be further engineered at multiple points during sol-gel processing by modifying the host solid, the guest solid, the composite gel, or the composite aerogel.

DESCRIPTION OF THE PREFERRED EMBODIMENTS

Throughout this application, all references cited are incorporated by reference in their entirety and for all purposes.

Typical precursors for gels or aerogels are metal alkoxides represented by the general formula $(M(OR)_n)$. For silica structures, the typical precursor is an oxysilane represented by the general formula $(Si(L)_{4-n}(OR)_n$, where R is organic (typically alkyl), where each —OR may be the same or different if more than one —OR is attached to the silicon, where n is an integer having a value of 1 to 4, and where L is any group other than —OR.

As used herein, the terms "sol", "gel", "xerogel" and "aerogel" are used in their commonly accepted meanings. In particular, the term "sol" refers to a colloidal suspension of precursor particles and "gel" refers to a wet three-dimensional porous network obtained by condensation of the precursor particles. Examples of sols include, but are not limited to silica sols, zirconia sols, vanadia sols, manganese oxide sols, magnesia sols, niobium oxide sols, alumina sols, tungsten oxide sols, yttria sols, tin oxide sols, cobalt oxide sols, nickel oxide sols, ceria sols, titania sols, calcia sols, aluminosilicate sols, or mixtures thereof. The sol could also be an non-oxidic or organic sol. As used herein, the term "network" is defined conventionally to mean a solid frame that sustains its shape and weight in the environment in which it is formed. That environment is the volume defined by the liquid phase precursors (solvent and any solutes) filling the vessel used for gelation. In the specification and the claims that follow, the onset of gelation is defined as the time at which the colloidal particles that comprise the sol (not to be confused with colloidal guest particles) begin to link together in the reaction volume. This point is accompanied by an increase in viscosity. In xerogels, the gel is dried under ambient conditions, leading to collapse of the pores, densification of the oxide structure and considerable shrinkage. In aerogels, the gel is dried under supercritical conditions to form a high surface area, high-porosity, ultra-low-density material. In supercritical drying, the pore-filling liquid is taken above its supercritical temperature and pressure before extraction, which prevents capillary forces from developing and then collapsing the pores of the gel. Other methods for preventing the collapsing of the pores and for forming aerogels are known, including evaporation of low surface tension liquids from the pores, freeze-dry extraction of the pore fluid, the addition of a low surface tension agent followed by evaporation, silanization of the wet gel followed by evaporation, etc.

In the present invention, a gel composite is formed by adding a guest particulate to a sol at or near the onset of gelation. The guest particulate may be in the form of a dispersed particulate, colloidal suspension or powder.

As used herein, the term "dispersed particulate" refers to a non-colloidal particulate in which material is retained in a liquid phase without substantively complete visible settling, i.e., in which settling has not reached equilibrium. The degree of settling that is permissible depends upon the intended use for the composite aerogel. Where good transport properties from guest-to-guest are critical, visible settling should be minimal or negligible. If transport properties are not critical, the extent of settling may be greater. In some instances, it may be useful to allow settling of the particulate guest until a gradient of the particulate within the liquid-solid suspension develops.

As used herein, the term "colloidal suspension" refers to a suspension of particulates that does not undergo settling under the conditions existing at the onset of gelation. Throughout the specification and claims, the network of an aerogel refers to the frame (i.e., the solid portion) of the aerogel that defines the pores. The frame of the aerogel does not include the pores or material trapped in the pores. A particulate is said to be incorporated into the network of an aerogel if particles of the particulate form part of the frame of the aerogel. This definition excludes conventional structures in which particulates are added after substantial gelation (and, consequently, matrix formation) has occurred. In those prior art structures, by the time the particulates are added, the network has already developed to the extent that the added particulates may, at best, form a deposit on or coat the matrix frame and do not form a part of the matrix frame.

The timing of the commingling of the sol and particulate guest should be such that the dispersed particulate or, colloidal particles may be incorporated in the growing network. If commingling with the particulates occurs too much before gelation, the particles may agglomerate and/or settle to the extent that they can no longer be incorporated in the network of the aerogel once gelation begins; further, if the particulates are commingled with the sol (or its molecular precursors) too soon before gelation, the particulates risk a high level of coverage or encapsulation by the sol. If commingling with the particulates occurs too late after the onset of gelation, the network of the aerogel will be too well-formed to incorporate the particulates.

Typically, the desired incorporation of the particulates (dispersed particles, colloidal particles, or powders) occurs if the particulate phase is commingled with the sol within one-half hour of gelation (particularly if the particulate guest is added to the sol). More often, the desired incorporation of the particulates (dispersed particles, colloidal particles, or powders) occurs if the particulate phase is commingled with the sol within 10 minutes of gelation. Most often, the desired incorporation of the particulates (dispersed particles, colloidal particles, or powders) occurs if the particulate phase is commingled with the sol within three minutes of gelation. If the particulate is large enough to settle, then it may be advantageous to lightly agitate (by shaking, stirring, etc.) the sol/guest mixture immediately after the mingling of the particulate with the sol. The duration and degree of agitation depends on the intended end use of the composite. Where a homogenous composite without transport paths is desired, heavier agitation for a longer duration assists in providing the desired homogeneity. If desired, agitation may be continued throughout the gelation process. If transport paths are desired, it may be best to only lightly agitate the sol/guest mixture, and the agitation is best completed before complete gelation occurs.

Any size of particle may be incorporated into the network of the present composite. Typically, average particles sizes incorporated into the network of the present composite are up to about 1 mm, and are more often about 1 nm up to about 100 $\mu$m. The volume percent of the particulate guest that is added to the sol may be above or below a threshold for electrical, thermal, or ionic conductivity.

The particulate may be any powder, dispersed particulate, or colloidal suspension, regardless of chemical composition, although the particulate is preferably insoluble in and non-reactive with the solvent for the sol. Some typical particulates include Pt; Au; $TiO_2$; $SiO_2$; Ag; Cu; Al; Fe; $RuO_2$; Si; GaAs; ZnO; CdS; C (any carbon allotrope, such as graphite, diamond, fullerenes, nanotubes, blacks, soots, vitreous carbon, coke); Pd; $Bi_2Te_3$; high molecular weight polymer, including, but not limited to polymethyl methacrylate; zeolites, including, but not limited to a synthetic type Y faujasitic aluminosilicate zeolite; mesoporous ceramics other than mesoporous ZnO, mesoporous $TiO_2$, or mesoporous $RuO_2$; and mixtures (homogeneous or segregated) thereof. The particles of the particulate may be composites, and also, more than one species of particulate may be commingled with the sol.

In one embodiment of the invention, a particulate (dispersed particulate, colloid suspension, or powder) is poured or otherwise added to a sol shortly before or shortly after the onset of gelation. This method works well when the particle sizes of the particulates are less than about 1 $\mu$m. Particularly for larger particle sizes, it may be best to add the sol to the particulates (which may or may not be dispersed and which may or may not be suspended in a liquid-phase; for example, the particulates may be in the form of a bed of powder) and then commencing gelation of the sol, preferably simultaneously with addition or shortly thereafter. When the sol is added to a particulate volume, the amount of time between addition and the onset of gelation is less critical than when the particulate is added to the sol. That is, the pouring of sol into the particulate volume may occur at a greater time interval before gelation than the time interval allowed between the pouring of the particulate into a sol and the onset of gelation.

The composites can be formed as monoliths, powders or films (by preparation of the aerogel on a substrate, possibly followed by removal of the film from the substrate if a free-standing, rather than supported, film is desired). The surface characteristics of the substrate may be modified, if desired, by conventional means such as etching (e.g., chemical, mechanical, ion, or plasma) or use of a molecular primer to control the degree of adhesion between the substrate and the aerogel film.

Of particular interest in the present invention are those composite aerogels in which the average size of the particulates (as determined by electron microscopy) is smaller than the average (median) pore size (as determined by porosimetry). In such composites, it would normally be expected that the small particles could be extracted or washed out from the pores of the aerogel. However, in the present invention, those particles cannot be removed by extraction or washing.

The particulates in the aerogel composites of the present invention may also be modified to include various functional groups on the surfaces of the included particulates. For example, the surfaces of the particulates added to the gel may, before or after gelation, be functionalized by covalent bonding, chemisorption, precipitation, self-assembly, physisorption, metal-ligand coordination bonding, hydrogen bonding or electrostatic bonding to a chemical modifier. The chemical modifier may be, for example, an organic molecule, a biomolecule (e.g., a receptor site), a metal complex, a metal or ceramic precipitate, etc. This functionality can provide the composite with properties advantageous for specific uses such as metal removal, molecular recognition, biological purification, catalysis, electronics, electrical power, optical-switching, or energy transduction (e.g., photovoltaics). Generally, the modifiers used to provide conventional surfaces with those properties are well known and may be readily applied to the surfaces of the particulate guests in the present invention by those skilled in the art without undue experimentation.

Similarly, after the composite has formed, the frame of the aerogel may be surface modified, by conventional surface modification methods, such as those referenced above, to provide desired surface properties. For example, the surface of the frame may be silanized to change hydrophilicity or hydrophobicity of the frame.

The present invention may use any sol that gels to form a three-dimensional or fractal network. While most commonly used sols are in aqueous or alcoholic media and are based on metal oxides (including double metal oxides) made from metal alkoxide (including double metal alkoxide) precursors, the present invention is also useful with sols in non-aqueous or water-free media (made, for example, from carboxylate precursors by a non-hydrolytic route as described in the prior art) or non-oxidic sols (made, for example, by non-hydrolytic routes where the chalcogenide moiety is not oxygen).

Composite aerogels are platforms that provide opportunities to engineer a broad range of nanoscopic materials with specific pre-selected properties. The gel preparation scheme described herein offers multiple means to further tailor the optical, chemical, and physical properties of the guest solid, the composite wet gel or the dried aerogel by way of solution- or gas-phase modification. Additional tailoring of the composite gel architecture can be achieved by modifying the surface of the particulate guest prior to gelation. Active sites that are introduced to the surface of the guest particles prior to gelation remain accessible to external reagents after supercritical drying. Carbon-supported metal colloids in carbon-silica composite aerogels (produced by combining colloidal metal-modified Vulcan carbon with silica sol) remain accessible to CO and MeOH, and have been electronically addressed within the aerogel to catalyze redox reactions.

High-surface-area carbon blacks are typically used in fuel cells to disperse the nanoscale electrocatalyst. They may be fabricated into a fuel-cell electrode of the required geometry by combining them with a porous binder, such as poly (tetrafluoroethylene) (see, for example, M. P. Hogarth and G. A. Hards, *Platinum Metals Rev.* 1996, 40, 150 and K. Kordesch and G. Simader, *Fuel Cells and their Applications*, VCH, Weinheim 1996 incorporated herein by reference). Composite aerogels should improve existing electrocatalytic technologies because their integrated structure offers multi-functionality by providing superior access of fuel and oxidant to the dispersed, carbon-supported catalyst by way of the continuous mesoporous network, while also maintaining electronic conductivity throughout the composite.

Modified carbon-silica composite aerogels may be useful as black optical materials as well. Neither ambient nor He—Ne laser light is transmitted through a 1-cm monolithic carbon-silica composite aerogel, despite its high porosity (see, for example, C. A. Morris, M. L. Anderson, R. M. Stroud, C. I. Merzbacher, D. R. Rolison, *Science* 1999, 284, 622, incorporated herein by reference). In contrast, native silica exhibits clarity that transmits light with little scattering. Opaque or low-reflectivity coatings and monoliths may be prepared and the wavelengths that are absorbed can then be extended beyond the visible by adsorbing molecular modifiers to the carbon. The surface of the guest particulate may also be tailored following gelation by adding solution-phase reagents to the pore-fluid washes that are performed prior to supercritical-fluid drying. For example, the surface of gold colloids larger than ~20 nm remains accessible to external reagents by way of the three-dimensional mesoporous network of the composite gel. (see, for example, M. L. Anderson, C. A. Morris, R. M. Stroud, C. I. Merzbacher, D. R. Rolison, *Langmuir* 1999, 15, 674, incorporated herein by reference.) The base-conjugate form of the pH-sensitive dye methyl orange preferentially adsorbs (from acetone solution) to the metal surface in colloidal Au-silica composite wet gels, and not to the surface of the silica domains. The UV-visible absorption spectrum of a methyl-orange-modified colloidal Au-silica gel exhibits resolved peaks for colloidal Au and methyl orange. A more complex modification of the metal surface architecture using solution-phase reagents can be conceived that customizes these composites with molecular recognition centers for analyte specificity or tailors the colloidal metal-modified carbon-silica composites for more efficient electrocatalysis.

Modification of the composite aerogel following supercritical drying may also be employed. For composite aerogels that do not contain organic moieties, partial densification at elevated temperatures can be used to strengthen the silica network. (see, for example, E. Hummer, X. Lu, Th. Rettelbach, J. Fricke, *J. Non-Cryst. Solids* 1992, 145, 211; C. Lorenz, A. Emmerling, J. Fricke, T. Schmidt, M. Hilgendorff, L. Spanhel, G. Müller, *J. Non-Cryst. Solids* 1998, 238, 1; A. Martino, S. A. Yamanka, J. S. Kawola, D. A. Loy, *Chem. Mater.* 1997, 9, 423; M. T. Reetz, M. Dugal, *Catal. Lett.* 1999, 58, 207, T. Woignier, J. Phalippou, and M. Prassas, *J. Mater. Sci.*, 1990, 25, 3118, and J. Cross, R. Goswin, R.. Gerlach, J. Fricke, *Rev. Phys. Appl.* 1989, 24, C4-185, incorporated herein by reference). Silica or colloidal Au-silica composite aerogels heated to 900° C. shrink (~50 % reduction in the size of the monolith), but the primary loss in free volume, as determined by $N_2$-physisorption measurements, occurs by collapse of the micropores (pores<2 nm), while most of the mesoporosity (2- to 50-nm pores) is preserved. Preserving the mesoporous free volume means that the most facile mass-transport pathways through the composite aerogel for gas- or solution-phase reactants remain unaltered. Furthermore, the composite constitutes a rigid solid architecture, such that the silica aerogel structure and metal particle size distribution are retained in partially densified colloidal Au-silica composite aerogels.(see, for example, M. L. Anderson, D. R. Rolison, C. I. Merzbacher, *SPIE Engineered Nanostructural Films and Materials* 1999, 3709, 38, incorporated herein by reference).

Partially densified composite aerogels are sufficiently durable that they remain intact upon reimmersion into liquids. This durability can be demonstrated by preferentially adsorbing methyl orange from solution onto the Au surface in partially densified colloidal Au-silica composite aerogels, analogously to the specific adsorption of the dye in colloidal Au-silica composite wet gels, as described above. This surface-specific modification is consistent with the retention of a continuous mesoporous network in silica-based composite aerogels, even after partial densification, as indicated by $N_2$-physisorption studies comparing as-prepared and partially densified aerogels. On the basis of these independent measurements of the total sample pore volume that is contributed by micro- and mesopores, nearly 60% of the 500° C.-annealed aerogel mesoporosity is preserved in the 900 ° C.-partially densified aerogel, while <15% of the microporous volume is retained in the partially densified sample.

The feasibility of optical or calorimetric sensing with composite gels has been verified by using a combination of modification steps. A multistep modification strategy has been demonstrated by thermally densifying 50-nm colloidal gold-silica composite aerogels and modifying the colloidal Au guests with methyl orange by immersion of the partially densified composite aerogel into a nonaqueous solution of the dye. Analogously to the wet composite gels discussed above, resolved peaks for the Au plasmon resonance and the methyl orange (base-conjugate form) absorbance are seen in the UV-visible spectrum of a methyl-orange-modified colloidal gold-silica composite aerogel that was thoroughly rinsed with acetone, then air-dried. Exposing the dye-modified, air-dried composite to HCl vapor produces a red-shift in the dye's absorption, corresponding to its protonation. The gas-phase acid molecules may be detected either visually or by instrumental colorimetry. Visual detection is possible because although the surface coverage of the adsorbed dye is quite low (typically <0.1 of a monolayer), the surface-to-volume ratio of the composite is enormous, which brings the effective concentration of the dye in the modified composite aerogel to millimolar levels. Color changes are rapid, because of the high porosity, and are readily discerned visually. Upon uptake of methyl orange, the color of the colloidal Au-silica composite aerogel changes from cranberry to peach (again, no methyl orange is retained in partially densified pure silica), and a further color change from peach to bright pink occurs within seconds of exposure of the dye-modified Au-silica composite aerogel to HCl vapor.

Having described the invention, the following examples are given to illustrate specific applications of the invention, including the best mode now known to perform the invention. These specific examples are not intended to limit the scope of the invention described in this application.

EXAMPLES

In the following examples, colloidal Au (sized at either 5 nm or 28 nm) was immobilized in a silica aerogel structure according to the method of the present invention. The optical properties of these materials were characterized by UV-visible absorption spectroscopy, while structural characterization was achieved using a combination of contrast-matching small-angle neutron scattering (SANS), transmission electron, microscopy (TEM), and physisorption measurements.

Colloid Preparation. A range of Au colloidal sols was purchased (BB International), and nominally 10-nm Au colloidal sols were prepared by citrate ($Na_3C_6H_5O.2H_2O$, AlfaAESAR, 99%) reduction of tetrachloroauric acid ($HAuCl_4$, 99%, AlfaAESAR, 49% Au), (See Horisberger, M. J. Histochem. Cytochem. 1977, 25, 296.). All glassware was cleaned in a base bath and rinsed copiously with 18 MΩcm water (Barnstead NANOpure) prior to preparation of or use with the Au sols. A 1% citrate solution (2.5 mL) was added (under flowing argon purified by passing through a Drierite/4-Å molecular sieve tower) to 200 mL of deaerated boiling water, immediately followed by addition of 2.0 mL of a 0.79% solution of $HAuCl_4$ (transparent yellow in color). This solution was refluxed for 35 minutes under flowing Ar during which it developed a purple-black color, followed by the deep cranberry color characteristic of a 10-nm Au sol. This colloidal sol was cooled to ambient under flowing Ar and then transferred to an amber reagent bottle for storage. High resolution transmission electron microscopy (described below) of the purchased 5-nm colloidal Au sol and the colloidal Au sol prepared in-house has shown that these sols have mean particle diameters of 5.6±0.3 nm and 28±5 nm, respectively.

Aerogel Preparation. Acid- and base-catalyzed silica aerogels were prepared by procedures similar to those previously published in Russo et al., *J. Non-Cryst. Solids,* 1986, 86, 219; Merzbacher et al., *J. Non-Cryst. Solids,* 1998, 224, 92; and Ellerby et al., *Science* 1992, 225, 1113. For base-catalyzed gels, two beakers were prepared: one with 3.939 mL of tetramethoxysilane (TMOS, Alfa AESAR, 98%) and 4.519 mL of methanol (MeOH), the other with 4.514 mL of MeOH, 1.524 mL of $H_2O$, and 5.2 µL of $NH_4OH$ (30% in $H_2O$, Aldrich). The two solutions were combined and stirred for 1 minute, and the mixture was poured into cylindrical molds (13×57 mm, filled with about 3 mL of clear, transparent sol) and covered with Parafilm. Acid-catalyzed gels were prepared by adding 4.5 mL of a pH 4.6 potassium hydrogen phthalate/NaOH buffer to a beaker containing 2.621 mL of TMOS, 0.545 mL of $H_2O$, and 0.035 g of 0.04 N HCl, which had been sonicated for 10 minutes, the mixture was stirred for 1 minute, poured into molds and covered with Parafilm.

Both acid- and base-catalyzed gels were aged in their molds for 1 day, then transferred to about 20-mL glass vials and rinsed 8–12 times with acetone over 3–4 days. The base-catalyzed gels were rinsed with ethanol at least 3 times before washing with acetone, which would otherwise react with the base catalyst to form a yellow-orange product (possibly due to base-catalyzed formation of the enol tautomer of acetone). The gels were then introduced into a supercritical dryer (Fisons Bio-Rad E3000), and the acetone was replaced with liquid $CO_2$, which was brought above its critical temperature and pressure ($T_c$=31° C.; $P_c$=7.4 MPa) and then released to dry the gels. Gel shrinkage during the supercritical drying step was minimal. The dried gels were sintered at 500° C. for 2 hours, also with minimal shrinkage. The base-catalyzed gels and aerogels were almost transparent, while the acid-catalyzed aerogels were a translucent white.

Colloidal gold aerogels were made by preparing an acid- or base-catalyzed silica sol, as described above, and adding a volume of Au sol equivalent to the volume of silica sol to produce a 50:50 vol % sol of Au—$SiO_2$. This colloidal mixture was stirred for about 1 minute and then poured into molds and treated as described above. The finished aerogel monoliths were identical in appearance to the pure silica gels (i.e., nearly transparent or translucent for base- and acid-catalyzed silica sols, respectively), but with a pink coloration due to the immobilized colloidal Au. To ensure that any observed changes to the silica structure and properties were attributable to the presence of the colloidal Au and not due to volume dilution of the standard silica sol, diluted silica blanks were prepared by removing a small aliquot of the about-to-gel silica sol (prior to addition of the Au sol) and diluting with an equivalent volume of $H_2O$ to produce a 50:50 vol % $SiO_2$:$H_2O$ sol (designated as diluted $SiO_2$), which was then treated in the same manner as the other samples.

Composite aerogels with a diverse chemical and size range of suspended particulates including: colloidal Au sized at 5, 10, 20, 30, 50, and 100 nm; colloidal Pt sized at 2–3 nm; zeolite powders (sized at 0.1–1 $\mu$m), colloidal $TiO_2$ (Degussa P25); powdered $TiO_2$ aerogel; powdered poly (methyl methacrylate) (sieved to <44 $\mu$m); 1-$\mu$m $Bi_2Te_3$ powder; and carbon black (Vulcan XC-72) were successfully formed.

Physical Characterization. The nanoscale dimensions of the guest and host make it difficult to directly measure the structural relationship of the Au colloid and its effect on the aerogel; therefore, a combination of analytical techniques has been used to characterize the composite aerogels.

Optical Characterization. One method for probing the properties of these new colloidal Au—$SiO_2$ aerogels is through changes in the surface plasmon resonance of the immobilized Au particles as compared to that in the sol. UV-visible absorption spectra for the colloidal gold sols and aerogel a monoliths were obtained using an HP 8452 diode array single-beam spectrophotometer in the spectrum/peaks mode. Powdered aerogels brushed or Au sols evaporated onto holey-Al grids were analyzed using a Hitachi H-9000 high-resolution transmission electron microscope. Normalized UV-vis absorption spectra were obtained for 5-nm and 28-nm colloidal gold suspensions and for base-catalyzed colloidal Au—$SiO_2$ aerogel monoliths. Pure base-catalyzed $SiO_2$ is optically transparent throughout this region. A spectral peak at ca. 500–550 nm is attributed to the Au surface plasmon resonance. As the diameter of the Au colloid increases, the absorption peak shifts to longer wavelengths, consistent with reported experimental results and theoretical calculations based on Mie's theory, (see, for example, the following publications incorporated herein by reference: Wilcoxon, J. P.; Martin, J. E.; Schaefer, D. W. *Phys. Rev. A* 1989, 39, 2675; Khlebtsov, N. G.; Bogatyrev, V. A.; Dykman, L. A.; Mel'nikov, A. G. Opt. Spectrosc. 1996, 80, 128; Bloemer, M. J.; Haus, J. W.; Ashley, P. R. *J. Opt. Soc. Am. B* 1990, 7, 790.) Such a red-shift, accompanied by peak broadening, is also observed when aggregation of the particles is induced upon $H_2O$ evaporation from the as-prepared sol.

Absorbance maxima of 506 nm (66-nm full width at half maximum, fwhm) and 512 nm (59-nm fwhm) were obtained for the 5-nm and 28-nm sols, respectively. This absorbance maximum is blue-shifted by about 10 nm after immobilizing either 5-nm or 28-nm Au in the silica aerogel. On the basis of the optical trends observed for the Au sols as well as the TEM studies of the composite aerogels (see below), the colloids are not agglomerated in the aerogel. The observed blue shift is attributed to a $SiO_2$—Au interaction, although Au surfaces are known to be vitreophobic. Others have synthesized colloidal Au particles encased in dense silica-shells (after first priming the gold surface with a silane modifier) and observe a red-shift for the Au plasmon resonance (see, for example, Liz-Marzán, L. M.; Giersig, M.; Mulvaney, P. *Chem. Commun.* 1996, 731 and Liz-Marzán, L. M.; Giersig, M.; Mulvaney, P. *Langmuir* 1996, 12, 4329, incorporated herein by reference). The colloidal Au—$SiO_2$ composite aerogels of the present invention are chemically and physically distinct from the Au core-$SiO_2$ shell particles in that the aerogel-immobilized Au is not pre-silanized and sees a low-density silica (which has a refractive index more representative of air). Due to scattering from the acid-catalyzed silica network, no UV-vis spectra were obtained for the acid-catalyzed colloidal Au-silica aerogels.

High-Resolution TEM. Despite , the insulating nature of silica and the low Au colloid concentration (about $10^{12}$ particles/mL) in the composite aerogels, high-resolution TEM micrographs of single colloidal Au-silica particles were obtained. One showed a single 22-nm Au colloid (the dark spheroid) nestled in nanoscale silica. The slightly elliptical appearance of the Au colloid is typical for particles in metal sols, which generally exhibit some polydispersity in both metal colloid size and shape. Measurements on several Au particles in this aerogel indicate an average particle size of 21.7±0.8 nm. Higher magnification of the Au colloid revealed a polycrystalline surface surrounded by amorphous silica (as indicated by uniform gray mottled regions around and slightly edging over the gold particle). Several domains of lattice fringes were apparent which have a spacing of 0.288 nm, corresponding to the <110> planes of the Au face-centered cubic (fcc) lattice.

The size of the aerogel-incorporated Au colloids as derived from the TEM measurements was twice that expected based on the UV-vis results. A related discrepancy was reported by one group who observed a 10-fold larger Au particle size by TEM than that determined by spectroscopy. (See, for example, Yazawa, T.; Kadono, K.; Tanaka, H.; Sakaguchi, T.; Tsubota, S.; Kuraoka, K.; Miya, M.; De-Xian, W. J. Non-Cryst. Solids 1994, 170, 105, incorporated herein by reference.) Despite a correlation between the absorption maximum, fwhm, and the Au particle size, changes in the linear absorption spectrum are often masked by ,distributions of particle sizes and shapes and by the large bulk value of the imaginary part of the complex dielectric response, particularly for particles larger than about 5 nm. Another group reported a slight red-shift in the absorbance maximum with increasing particle size for 5–30-nm Au sols but obtained the same fwhm of about 50 nm for 5-, 10-, 15-, and 30-nm Au sols (see, for example, Bloemer, M. J.; Haus, J. W.; Ashley, P. R. *J. Opt. Soc. Am. B* 1990, 7, 790, incorporated herein by reference.) With the present invention, similar results were observed for the same range of colloid sizes, with a red-shift of about 6 nm in absorbance peak position between 5- and 30-nm Au sols, and a range of fwhm values of 49–66 nm (increasing as particle size decreases). Also, TEM measurements on the Au sol used to prepare the composite aerogel indicate a range of Au particle sizes from nearly spheroidal (20×21 nm±1 nm) to elliptical (26×40±1 nm). On the basis of these results, the TEM measurements provide a more accurate indication of the colloidal Au particle size, shape, and size distribution.

Small-Angle Neutron Scattering (SANS). Small-angle scattering has been used to characterize aerogels due to its sensitivity to structural features over a length scale of 1–200 nm. In the case of colloidal Au-silica aerogels of the present invention made according to the examples, this length scale covers not only a critical range for the $SiO_2$ structure but also the size of the Au particles incorporated into the $SiO_2$ structure.

SANS data were collected on a 30-m SANS spectrometer at the National Institute of Standards and Technology (NIST Gaithersburg, Md.) using configurations and data analysis procedures detailed elsewhere in Merzbacher, et al., *J. Non-Cryst. Solids* 1998, 224, 92 and Merzbacher, et al., *J. Non-Cryst. Solids* 1998, 225, 234, incorporated herein by reference. Samples for the SANS studies were aerogel disks about 1–2 mm thick dry cut (with a diamond saw) from cylindrical monoliths. In contrast-matching SANS, the aerogel pores were filled with a $H_2O/D_2O$ mixture that matched the neutron scattering properties of either $SiO_2$ (42:58 vol % $H_2O:D_2O$) or Au (26:74 vol % $H_2O:D_2O$). The sintered aerogels were rewetted by placing them in a saturated environment of the appropriate contrast-matching fluid at 85° C. for at least 9 hours prior to immersing the sample in $H_2O:D_2O$.

In the small-angle neutron scattering results obtained for acid-catalyzed silica aerogels with and without colloidal Au, the scattering curve for the standard (undiluted) silica aerogel is similar to those published previously. The curve for the diluted silica aerogel is largely similar to that of the undiluted sample, except at low scattering vectors, q, indicating that the structures of the two materials are also similar. The transition to a slope of nearly zero at low log q occurs at length scales that correlate with the size of the largest scatterers ($q=2\pi$/length). The shift in this transition to lower values of log q for the diluted aerogel indicates that the fractal network structure extends to longer lengths.

To probe the influence of the colloidal Au guest on the structure of the silica network, the pores were filled with a Au contrast-matching fluid. It was previously shown that the pores of silica aerogel ($\leq 88\%$ porosity) can be refilled with water without affecting the network structure. The slope of the curve for the Au-matched acid-catalyzed composite aerogel is essentially identical to the curve for the dry silica. The high log q cutoff occurs at slightly lower values of log q because of incoherent background scattering from the hydrogen in the pore-filling liquid. Rather than a near-zero slope at low log q, the slope becomes steeper, which is a feature observed for all rewetted aerogels and is attributed to the presence of a few large (micrometer size) bubbles.

On the basis of the similarity of the scattering curves of the pure $SiO_2$(ac), dry Au—$SiO_2$ (ac), and the Au-matched Au—$SiO_2$(ac) aerogels, the acid-catalyzed silica structure is unaffected by incorporation of small amounts of either 5-nm or 28-nm colloidal Au. However, SANS cannot be used to address the average structure of the colloidal Au in these composite aerogels. The scattered intensity from the Au component, expressed in the $SiO_2$-matched sample for both acid-catalyzed and base-catalyzed 28-nm Au:$SiO_2$ aerogels, is essentially at background levels, which is reasonable due to the low Au concentration in these samples.

SANS spectra for the analogous base-catalyzed silica ($SiO_2$ (bc)) and colloidal Au—$SiO_2$ (bc) series show that, unlike the acid-catalyzed samples, scattering from the standard and diluted $SiO_{02}$ samples does differ, both in the shape of the roll-off to near-zero slope and in the slope of the near-linear region ($-0.5<\log q<0.5$ $nm^{-1}$). These differences indicate that structural changes are induced by diluting the base-catalyzed $SiO_2$ sol with pure water prior to gelation. A pure water dilution of the standard base-catalyzed silica sol does not appear to be a good control for these gels, most likely because the base-catalyzed sol is unbuffered (whereas the acid-catalyzed sol was prepared in a pH 4.6 buffer). It was confirmed that a shift to lower pH does occur when base-catalyzed silica sol is diluted (50:50 vol %) with pure water.

The shape of the spectra for both the dry and the Au-matched 28-nm Au—$SiO_2$ (bc) does, however, mimic that of the undiluted $SiO_2$ (bc) aerogel (except at the extremes of log q, for the reasons stated above). Diluting the base-catalyzed silica sol with Au sol does not lower the pH of the unbuffered silica sol to the extent that pure water does, so the kinetics of gelation are more comparable to the undiluted silica sol.

Physisorption Characterization. Nitrogen physisorption measurements (at 77 K) of the various aerogel monoliths were obtained using a Micromeritics ASAP 2010 accelerated surface area and porosimetry system. Reported surface areas are based on a multipoint BET analysis, and average pore sizes and distributions were determined using data reduction programs provided by Micromeritics, including their DFTplus® program. The data were best fit using the BJH equation with a cylindrical pore geometry. In adsorption and desorption isotherms determined from $N_2$ physisorption measurements on acid- and base-catalyzed $SiO_2$ and colloidal Au—$SiO_2$ aerogels, all of the isotherms exhibit essentially the same shape, including a small amount of hysteresis between the adsorption and desorption isotherms. This behavior is characteristic of materials with both micro- and mesoporosity (pores <2 and 2 nm to 50 nm in size, respectively). The relatively small degree of hysteresis indicates that the energetics of the pore-filling and -emptying processes are similar in nature. Isotherms for acid- and base-catalyzed $SiO_2$ aerogels in their standard (undiluted) form are identical in appearance to those shown and are similar to published results.

The volume of adsorbed gas per gram of sample was found to be considerably greater for the base-catalyzed gels than for their acid-catalyzed counterparts. Consequently, the BET surface areas for the base-catalyzed gels, as derived from their isotherms, are >900 $m^2$/g, compared with about 750–820 $m^2$/g for the acid-catalyzed gels. Surface areas for each of the aerogels investigated are listed in Table 1.

TABLE 1

BET Surface Areas and Average Pore Diameters for Silica and Colloidal Gold-Silica Aerogels

| | surface area (±100 $m^2$/g) | | average pore diameter[a] (±0.9 nm) | | total pore volume[a] (±0.4 $cm^3$/g) | |
|---|---|---|---|---|---|---|
| | acid-catalyzed | base-catalyzed | acid-catalyzed | base-catalyzed | acid-catalyzed | base-catalyzed |
| $SiO_2$ | 752 | 992 | 8.8 | 13.4 | 1.53 | 2.73 |
| $SiO_2$:$H_2O$ (50:50 vol. %) | 811 | 1063 | 8.4 | 9.1 | 1.47 | 1.72 |
| 5 nm Au—$SiO_2$ (50:50 vol. %) | 767 | 937 | 8.3 | 14.8 | 1.41 | 3.04 |

TABLE 1-continued

BET Surface Areas and Average Pore Diameters for Silica and
Colloidal Gold-Silica Aerogels

| | surface area (±100 m²/g) | | average pore diameter[a] (±0.9 nm) | | total pore volume[a] (±0.4 cm³/g) | |
|---|---|---|---|---|---|---|
| | acid-catalyzed | base-catalyzed | acid-catalyzed | base-catalyzed | acid-catalyzed | base-catalyzed |
| 28 nm Au—SiO₂ (50:50 vol. %) | 781 | 979 | 8.3 | 12.7 | 1.39 | 2.81 |
| 30 nm Au—SiO₂ (50:50 vol. %) | | 856 | | 12.4 | | 2.30 |

[a]Taken as the average of calculations based on the absorption and desorption isotherms.

These results are consistent with the current understanding that acid-catalyzed silica gels have a ramified, branched structure, while base-catalyzed $SiO_2$ consists of a three-dimensional network of condensed particles with roughened surfaces, and they are in agreement with reports in the literature of higher surface areas for base-catalyzed than for acid-catalyzed silica aerogels.

The average pore diameter and total pore volume of the aerogels can also be extracted from the isotherms and are reported in Table 1. The average pore diameter is about 4–5 nm larger in the base-catalyzed gels than in the acid-catalyzed ones, and the pore-size upper limit (after which there is no significant pore density) is ~46 nm for all of the acid-catalyzed gels and ~162 nm for all of the base-catalyzed gels. The average pore size of 8.8±0.9 nm in the standard acid-catalyzed $SiO_2$ is identical to that of the diluted sample within measurement error and decreases by <0.5 nm for the Au-containing gels, regardless of the size of the Au colloid. Similarly, the total pore volumes for all of the acid-catalyzed samples are essentially the same.

Unlike the acid-catalyzed aerogels, the size of the incorporated colloidal Au does influence the average pore size and total pore volume in base-catalyzed gels. Incorporation of 28-nm Au colloids, despite their low concentration, results in a nearly 1 nm decrease in average pore diameter for the base-catalyzed system, and a further average pore size decrease is observed for a nominally (manufacturer-based) 30 nm Au—$SiO_2$ (bc) sample; see Table 1. The total pore volume in standard $SiO_2$ and in 28-nm Au—$SiO_2$ is nearly identical, while a decrease in total pore volume is observed for the 30-nm Au—$SiO_2$ sample. These results are consistent with a loss of pore volume relative to the pure silica aerogel resulting from occlusion of pore space by Au colloids. It is expected that colloidal Au—$SiO_2$ composite gels containing even larger diameter Au particles would show additional loss of pore volume and a corresponding smaller average pore diameter.

The average pore diameters and total pore volumes reported for the base-catalyzed aerogels reflect measurements on samples from two separate batches. The significant deviation in the physisorption character of the water-diluted silica samples as compared to the other base-catalyzed aerogels (with and without Au) may be related to the structural differences observed by SANS for the water-diluted $SiO_2$ (bc) aerogel. For unbuffered silica sols, the water-diluted sample does not appear to reflect the generic base-catalyzed structure either by SANS or by $N_2$ physisorption and is therefore not a good control for dilution effects.

Given the scale of the connected mesoporous network in these aerogels, it is somewhat surprising that 5-nm Au particles remain in the $SiO_2$ network following gelation and do not wash out (this result is distinctly different from the case in which a preformed silica gel soaked in Au sol visibly takes up Au colloid but the "absorbed" colloid visibly flushes out of the gel by washing). While some of the 5-nm Au particles may be trapped in pores from which they cannot escape, the fact that no apparent loss of 5-nm Au occurs upon washing or supercritical drying indicates that a unique structural composite has been formed. Base-catalyzed silica aerogel is understood to consist of ~10 nm colloidal particles of $SiO_2$ that are arranged in a three-dimensional pearl necklace structure. Given the similarity in size of the colloidal Au to the colloidal $SiO_2$, the 5-nm Au particles may be incorporated into the three-dimensional $SiO_2$ structure. An average pore diameter of 14.8±0.9 nm was determined for a 5-nm Au:$SiO_2$ (bc) aerogel from the physisorption measurements, which is several nanometers larger than that for standard $SiO_2$ (bc) gels. A corresponding increase in total pore volume (from 2.73 cm³/g for $SiO_2$ to 3.04 cm³/g for 5-nm Au—$SiO_2$) was also observed. Incorporation of the 5-nm Au colloids into the $SiO_2$ network is consistent with this result and would explain why these small particles remain in the gel after washing.

Obviously, many modifications and variations of the present invention are possible in light of the above teachings. It is therefore to be understood that, within the scope of the appended claims, the invention may be practiced otherwise than as specifically described.

What is claimed is:

1. A mesoporous composite produced by a method comprising the steps of:

commingling a colloidally suspended, powdered, or dispersed particulate with a sol within about one-half hour of the onset of gelation of said sol, to form a mixture;

gelling said mixture to form a gelled composite mixture in which particles of said particulate are incorporated in a network of a gelled sol, wherein said gelled sol comprises said network and liquid-filled pores; and drying said gelled composite mixture without substantially collapsing said pores to form a composite aerogel in which said particles of said particulate are incorporated in said network.

2. The mesoporous composite of claim 1, wherein said particulate is an aerogel particulate.

3. The mesoporous composite of claim 1, wherein said particulate is functionalized by the covalent bonding, chemisorption, precipitation, self-assembly, physisorption, metal-ligand coordination bonding, or electrostatic bonding of a chemical modifier.

4. The mesoporous composite of claim 1, wherein said network is functionalized by the covalent bonding, chemisorption, precipitation, self-assembly, physisorption, metal-ligand coordination bonding, or electrostatic bonding of a chemical modifier.

5. The mesoporous composite of claim 1, wherein said sol is a metal oxide sol that forms a network upon gelation.

6. The mesoporous composite of claim 1, wherein said commingling is performed within about 10 minutes of the onset of gelation of said sol.

7. The mesoporous composite of claim 6, wherein said commingling is performed within about 5 minutes of the onset of gelation of said sol.

8. The mesoporous composite of claim 7, wherein said commingling is performed within about one minute of the onset of gelation of said sol.

9. The mesoporous composite of claim 1, wherein said particulate is metallic, insulating, superconducting, or semiconducting.

10. The mesoporous composite of claim 9, wherein said particulate is colloidally suspended.

11. The mesoporous composite of claim 10, wherein said particulate has an average particle size less than about 1 mm.

12. The mesoporous composite of claim 10, wherein said sol is a silica sol, a zirconia sol, a vanadia sol, a manganese oxide sol, a magnesia sol, a niobium oxide sol, an alumina sol, a tungsten oxide sol, a yttria sol, a tin oxide sol, a cobalt oxide sol, a nickel oxide sol, a ceria sol, a titania sol, a calcia sol, an aluminosilicate sol, or a mixture thereof.

13. The mesoporous composite of claim 1, wherein particles of said particulate are metal, polymer, ceramic, or composite, and wherein a single species of particle, or a plurality of species of particle is commingled with said sol.

14. The mesoporous composite of claim 13, wherein particles of said particulate are metal oxides.

15. The mesoporous composite of claim 1, wherein said particulate comprises Pt; Au; $TiO_2$; $SiO_2$; Ag; Cu; Al; Fe; $RuO_2$; Si; GaAs; ZnO; CdS; C; Pd; $Bi_2Te_3$; high molecular weight polymer; zeolites; mesoporous ceramics other than mesoporous ZnO, mesoporous $TiO_2$, or mesoporous $RuO_2$; or a mixture thereof.

16. The mesoporous composite of claim 15, wherein said particulate is polymethyl methacrylate.

17. The mesoporous composite of claim 15, wherein said particulate is a synthetic type Y faujasitic aluminosilicate zeolite.

18. A composite aerogel including a plurality of guest particles incorporated into a network of an aerogel, a majority of particles of said particulate guest having surfaces that have at least a portion thereof exposed to open pores of said aerogel.

19. A mesoporous composite produced by a method comprising the steps of:

adding a sol to a volume of particulates such that said sol perfuses said volume of particulates within about one-half hour before the onset of gelation, thereby forming a mixture;

gelling said mixture to form a fully gelled composite mixture in which particles of said particulate are incorporated in a network of a gelled sol, wherein said gelled sol comprises said network and liquid-filled pores; and drying said gelled composite mixture without substantially collapsing said pores to form a composite aerogel in which said particles of said particulate are incorporated in said network.

20. A method of making a composite aerogel, comprising the steps of:

commingling a colloidally suspended, powdered, or dispersed particulate with a sol within about 30 minutes of the onset of gelation of said sol, to form a mixture;

gelling said mixture to form a fully gelled composite mixture in which particles of said particulate are incorporated in a network of a gelled sol, wherein said gelled sol comprises said network and liquid-filled pores; and drying said gelled composite mixture without substantially collapsing said pores to form a composite aerogel in which said particles of said particulate are incorporated in said network.

21. The method of claim 20, wherein said commingling is performed within about 10 minutes of the onset of gelation of said sol.

22. The method of claim 21, wherein said commingling is performed within about 5 minutes of the onset of gelation of said sol.

23. The method of claim 22, wherein said commingling is performed within about one minute of the onset of gelation of said sol.

* * * * *

UNITED STATES PATENT AND TRADEMARK OFFICE
CERTIFICATE OF CORRECTION

PATENT NO.    : 6,492,014 B1
DATED         : December 10, 2002
INVENTOR(S)   : Debra R. Rolison et al.

It is certified that error appears in the above-identified patent and that said Letters Patent is hereby corrected as shown below:

<u>Title page,</u>
Item [54], Title, change to -- MESOPOROUS COMPOSITE GELS AND AEROGELS --
Item [75], Inventors, change "Michelle L. Anderson" to -- Michele L. Anderson"

Signed and Sealed this

Thirteenth Day of April, 2004

JON W. DUDAS
*Acting Director of the United States Patent and Trademark Office*